United States Patent Office 3,318,072
Patented May 9, 1967

3,318,072
METHOD AND COMPOSITION EMPLOYING AN ARYL HALOMETHYL CARBINOL FOR CHROMATOGRAPHY
John Frank, Morristown, N.J., assignor to Allied Chemical Corporation, New York, N.Y., a corporation of New York
No Drawing. Filed July 10, 1964, Ser. No. 381,905
15 Claims. (Cl. 55—67)

This invention relates to a novel method for conducting gas chromatography operations and to a novel composition usable therein. The composition comprises an aryl halomethyl carbinol on a solid sorbent support material which is inert under the chromatographic conditions.

In gas chromatography, the components of a mixture are separated from one another by providing the sample as a vapor in a carrier gas stream which then passes through a column containing a "stationary phase" material having an affinity which varies for different components of the mixture. With a liquid stationary phase this varying affinity is generally expressed in terms of solubility of the sample mixture components in the liquid. Where the stationary phase is a solid, the affinity is expressed in terms of sorbability, whether absorbability or adsorbability. Because of the differential affinities, different components of the sample move through the stationary phase at different rates and so appear one after another at the effluent end of the column where they are detected and measured, often by thermal conductivity, density or ionization differences. Gas chromatography is advantageous as a means of analysis of minute quantities of complex mixtures from industrial, biological and chemical sources and is also of potential value in actually preparing moderate quantities of highly purified compounds otherwise difficult to separate from the mixtures in which they occur.

The material which comprises the stationary phase is ordinarily nonvolatile at the conditions of the process and is placed within the chromatographic column in such manner that movement of the stationary phase material during the process is substantially avoided. Also, since the effectiveness of chromatographic separation depends upon the net length of the stationary phase column through which the gas sample actually flows, voids are, in general, minimized. The stationary phase material is disposed on an inert support and in most situations, the inert support will be a particulate solid material, although when the stationary phase is a liquid and the column is of capillary dimensions, the walls of the column themselves, when suitable, may comprise the inert support, the capillary tube being internally coated with the stationary phase material. Inert particulate support materials usable in this invention are frequently inorganic oxide materials which are well-known in the art and include calcined diatomaceous earth, activated alumina, silica gel and such proprietary products as "Chromosorb" and "Gas-Chrom" which are siliceous, aluminous or argillaceous based inert materials. The "Chromosorb" varieties of crushed fireback are preferred support materials.

In this invention the stationary phase is an aryl haloethyl carbinol of the type:

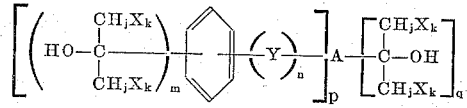

where X is a halogen of atomic number 9–35, that is, fluorine, chlorine or bromine, Y is a chalcogen (sulfur or oxygen) or alkylene of 1 to 4 carbon atoms such as methylene, and A is an aromatic radical such as phenylene or naphthylene. $j$ is zero to 1, $k$ is 2 to 3 and $j+k$ at each carbon equals 3. $j+k$ can vary within the same molecule, for example, the carbinol can be tri-substituted at one end and disubstituted at the other end. $m$, $n$ and $p$ each can equal 0 to 1; $q$ equals 1 to 2 and $p+q$ equals 1 to 2.

The preferred stationary phase materials are aryl bis (trihalomethyl)carbinols such as

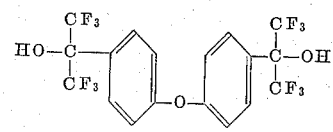

The stationary phase materials are described in and may be manufactured according to procedures disclosed in French Patent No. 1,325,204, herein incorporated by reference, the preparation being generally by the reaction of a suitable aromatic compound to supply the A or

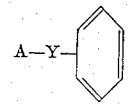

group with one or two molar parts of a ketone of the type $(CH_jX_k)_2CO$. The reaction may be of the Grignard type or may make use of a Friedel-Crafts catalyst, preferably $AlCl_3$.

Among the suitable A supplying compounds are those aromatic compounds having 6 to 12 carbon atoms in the aryl ring structure. The carbon rings of the aromatic compound can be of the benzene type as in the phenyl and phenylene groups, or fused as in naphthyl or naphthylene. This aromatic moiety may be non-substituted or can carry substituents of up to 15 or more carbon atoms. These substituents can be hydrocarbon groups, for example alkyl, preferably of short chain, for example, having up to 8 carbon atoms, including cycloalkyl groups, or substituents, such as halogens, including fluorine, chlorine and bromine, hydroxyl, etc.

Examples of such A-supplying compounds are: benzene, naphthalene, toluene, n-propyl benzene, xylenes, cyclohexylbenzene, 1-methyl-3-butyl benzene, ethylbenzene, fluorobenzene, chlorobenzene, 2-methyl-4-bromobenzene, 2,3-dichlorobenzene, 2,4-dibromobenzene, phenol, 1-hydroxy-2-methylbenzene, 1-hydroxy-4-hexylbenzene, 1,4 - dihydroxybenzene, 1,3,5 - trimethylbenzene, etc. Of course, when a Grignard reaction is to be employed, the divalent-metal monohalides or the alkali metal-substituted forms of these componds are reacted with the ketone. Such compounds are phenylmagnesium chloride and bromide, tolyl zinc bromide, naphthylmagnesium bromide, phenyl lithium, naphthyl lithium, etc. The reaction can employ one, two or sometimes even three moles of the ketone per mole of aromatic compound, depending on the aromatic selected. The alcohol is obtained by hydrolysis of the Grignard or Friedel-Crafts reaction product. Dilute mineral acid is usually used for this hydrolysis.

The chromatography medium of this invention comprises an amount effective in the desired separation, for instance, about 1 to 50% or more by weight of the halomethyl carbinol stationary phase material, the essential balance usually being the inert support. Often the stationary phase material will comprise about 5 to 25% of the composition. The aryl halomethyl carbinol is distributed on the inert support by any one of a number of different methods. For example, the carbinol may be dissolved in a suitable solvent, e.g. acetone, and inert support material added to the solution. Then the solvent may be evaporated, usually with occasional stirring, to uniformly coat the inert particles. Stationary phase materials which are liquid under the conditions of the chromatograph procedure are preferred.

The stationary phase materials of this invention have been found useful in resolving various organic and inorganic mixtures which can be vaporized or otherwise entrained in the carrier gas. This invention is particularly applicable to the resolution of hydrocarbon mixtures, the components of which may be saturated or unsaturated, substituted or unsubstituted and usually of relatively short chain length, often of up to about 12 carbon atoms and composed predominantly, if not completely, of close-boiling materials. The stationary phase material is especially useful where halogen, oxygen and hydrogen components of a mixture are to be separated from each other. These elements may sometimes appear as the elements themselves, as substituents of inorganic components or even as the substituents of basically similar or even identical organic radicals. The stationary phase material of this invention can separate a mixture of air, hydrogen chloride, chlorine, sulfur dioxide and phosgene or an organic mixture where some or all of the hydrocarbon components are substituted with halide, hydroxyl, keto and/or carboxyl moieties. Thus, the compositions of this invention have been found useful in separating the components of natural gas, in separating the components of commercially obtained n-heptane containing close-boiling aliphatic hydrocarbons, in separating trifluoroacetyl chloride from the crude reaction mixture obtained in its preparation and containing other chlorofluoro aliphatic components of 1 to 3 carbon atoms, in the separation of a mixture containing chloroform, methylene chloride, carbon tetrachloride, chlorobenzene, toluene and xylenes, etc.

The choice of stationary phase material will often depend upon the conditions, especially the temperature conditions, under which the chromatography process is carried out. The compositions of this invention are operable to give good separations over a wide range of temperatures, although the efficiency of any particular stationary phase material for separating mixtures of specific components may vary within the range. Temperatures of from about 0 to 250° C. are often employed, most often about 20 to 175° C.

The following examples of this invention are to be considered illustrative only and not limiting.

1,3-bis-(hexafluoro-2-hydroxy-2-propyl) benzene (sample 29) was manufactured by placing one gram of aluminum chloride and 78 grams (1.0 mole) of benzene in a five-necked flask equipped with a stirrer, an inlet tube, a thermometer, a solid-addition tube and a water-cooled condenser connected in series to a Dry Ice-acetone cooled condenser attached through a bubble counter to a drying tower packed with Drierite. The solid-addition tube was connected through wide flexible rubber tubing to a flask containing 20 grams aluminum chloride. Hexafluoroacetone (a total of about two moles) was passed through the bubble counter into the stirred reaction mixture at such a rate that little or no reflux was observed in the Dry Ice condenser, indicating total reaction of the ketone added. The temperature of the reaction mixture rose steadily to about 50° and was maintained in a 40° to 50° C. interval by occasional addition of $AlCl_3$ through the solid-addition tube, whenever the reaction temperature dropped to 40° C. After about 7 hours the reaction was complete and hydrolysis was performed without allowing time for the reaction product to decompose or rearrange. Hydrolysis was accomplished by dropwise addition of 500 ml. ice-cold water to the reaction mixture over about 30 minutes. A 200 ml. portion of chloroform was then added, the organic layer was separated, washed with cold water, dried over magnesium sulfate and fractionated through a 30 inch silver-plated column packed with protruded packing having an efficiency of from 10 to 15 theoretical plates. The product boiled at 200° C. at 760 mm.

A number of aryl halomethyl carbinols and aryl bis-(halomethyl) carbinols were made by a process similar to Sample 29, as listed in Table I below. In each sample, the stated aromatic compound was reacted in a manner similar to that disclosed in the preceding paragraph with hexafluoroacetone in the molar ratio listed.

TABLE I

| Product | Aromatic Compound | Molar Ratio of Aromatic to Ketone |
| --- | --- | --- |
| 29 | Benzene | ½ |
| 40 | ___do___ | ¼ |
| 91 | Toluene | ½ |
| 90 | Metaxylene | ½ |
| 427 | Paraxylene | ½ |
| 53 | Naphthalene | ¼ |
| 93 | Biphenyl | ½ |
| 51 | Diphenylmethane | ¼ |
| 227 | Diphenyloxide | ½ |
| 92 | Diphenylsulfide | ½ |

Sample 227 was coated on firebrick by dissolving 10 grams of Sample 227 in an excess of acetone. To this solution 90 grams of Johns-Manville C–22 Silocel firebrick in a mesh size ranging from 42–60 was added. The slurry was evaporated on a hot plate, leaving the firebrick uniformly coated with Sample 227. The coated particles were then packed into a 10 ft. length of ¼" diameter copper tube. The tube was made into a helical coil 6 inches high and 4 inches in diameter. The column then was installed into a Perkin-Elmer Gas Chromatograph Model No. 154B. Helium was used as carrier gas. The flow rate was 40 ml. helium per minute. The instrument was operated at between room temperature and 170° C. depending upon the temperature at which it was desired to effect separation.

*Example I*

Chlorinolysis of pentafluoromonochloroacetone for the preparation of $F_3CCOCl$ gave a mixture of several products, including $F_3CCOCl$, $ClF_2CCOCl$, $COCl_2$, $CCl_2F_2$, $F_3CCOCF_2Cl$ and $F_3CCOCFCl_2$. Attempted chromatographic analysis using a number of commercially available chemicals for the coating of column packing did not give satisfactory results. These included silicone gum rubber, Silicone QF-1, Apiezon L, Apiezon N, Kel-F oil, Kel-F grease, Dow Corning Silicone Oil 200, Carbowax 2000, and a number of other recommended compounds. Although these gave some separation, they did not separate $CCl_2F_2$ from $F_3CCOCF_2Cl$, which is essential for satisfactory analysis. Excellent separation was effected, however, with Sample 227 as the stationary phase.

*Example II*

A mixture of air, hydrogen chloride, chlorine, sulfur dioxide and phosgene was separated, using Sample 227 as the stationary phase, without excessive "tailing" by any compound.

*Example III*

Crude trifluoroacetic acid was analyzed chromatographically with excellent results using Sample 227.

*Example IV*

Natural gas is a mixture of many compounds. Sample 227 gave excellent separation into 12 components, equivalent to results obtained with the considerably more complicated and expensive Golay chromatographic column, using squalene, dinonyl phthalate, silicones, tricresyl phosphate, paraffin, hexadecane, or polyethylene glycol as packing coatings.

*Example V*

Sample 227 gave excellent separation of a mixture of chloro-fluoro lower alkanes, i.e. the "Genetrons," $CCl_2F_2$, $CCl_3F$, and $CF_2ClCClF_2$, with carbon tetrachloride.

Example VI

A mixture of lower alkanols (in this case methanol, ethanol and isopropanol) showed good separation using Sample 227.

Table II, below, shows the number of separate compounds found in three crude mixtures using each of the samples in Table I, coated on firebrick, in the chromatographic set-up described above. The natural gas and crude F₃CCOCl were run at room temperature and the commercial n-heptane at 80° C. Samples 427 and 29 did not give adequate separation of n-heptane because of excessive bleeding at the temperature of the test.

TABLE II

| Stationary Phase Sample | Number of compounds found | | |
|---|---|---|---|
| | Natural Gas | Commercial n-heptane | Crude F₃CCOCl |
| 40 | 16 | 9 | 7 |
| 51 | 10 | 11 | 5 |
| 53 | 15 | 10 | 9 |
| 227 | 12 | 10 | 7 |
| 29 | 16 | -------- | 9 |
| 90 | 3 | 3 | 1 |
| 91 | 12 | 8 | 9 |
| 92 | 11 | 9 | 7 |
| 93 | 4 | 3 | 1 |
| 427 | 13 | -------- | 7 |

These results show the effectiveness of using the defined stationary phase materials on particulate supports in a gas chromatography system. These aryl bis-(hexahalo) carbinols are also effective in the Golay type column where they are coated on the inside walls of a capillary tube through which the gas sample is passed.

It is claimed:

1. A composition suitable for use in gas chromatography consisting essentially of an amount effective in gas chromatography of an aryl halomethyl carbinol of the type

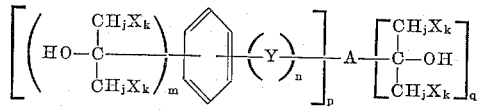

where X is a halogen of atomic number 9–35, Y is selected from the group consisting of oxygen, sulfur and alkylene of 1 to 4 carbon atoms, A is an aromatic hydrocarbon radical of 6 to 12 carbon atoms in the aryl ring structure, $j$ is 0 to 1, $k$ is 2 to 3, $j+k$ is 3 at each carbon atom, $m$, $n$ and $p$ each is 0 to 1, $q$ is 1 to 2 and $p+q$ is 1 to 2, on a solid inert, chromatographic sorbent support.

2. The composition of claim 1 in which the halomethyl carbinol is 1 to 50% of the composition.

3. The composition of claim 1 in which the inert support is crushed firebrick.

4. The composition of claim 1 in which X is fluorine and $k$ is 3.

5. The composition of claim 1 in which A is phenylene.

6. The composition of claim 5 in which the aryl halomethyl carbinol is 1,3-bis-(hexafluoro-2-hydroxy-2-propyl) benzene.

7. The composition of claim 1 in which

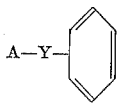

is diphenylene oxide.

8. The composition of claim 7 in which the aryl halomethyl carbinol is bis-(hexafluoro-2-hydroxy-2-propyl) diphenyl oxide.

9. A method for gas chromatography which consists essentially of passing an inert carrier gas containing a vaporous sample of mixed, close-boiling organic compounds which have a carbon chain length of 12 or less carbon atoms through a chromatographic column having as the stationary phase an aryl halomethyl carbinol of the type

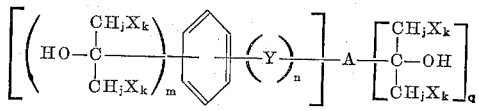

where X is a halogen of atomic number 9–35, Y is selected from the group consisting of oxygen, sulfur and alkylene of 1 to 4 carbon atoms, A is an aromatic hydrocarbon radical of 6 to 12 carbon atoms in the aryl ring structure, $j$ is 0 to 1, $k$ is 2 to 3, $j+k$ is 3 at each carbon atom, $m$, $n$ and $p$ each is 0 to 1, $q$ is 1 to 2 and $p+q$ is 1 to 2, and identifying the presence of a desired component of said sample resolved by said column.

10. The method of claim 9 in which the vaporous sample is natural gas.

11. The method of claim 9 in which the vaporous sample consists essentially of n-heptane and close-boiling aliphatic hydrocarbons which have a carbon chain length of 12 or less carbon atoms.

12. The method of claim 9 in which the vaporous sample consists essentially of F₃CCOCl and close-boiling chloro- and fluoro-aliphatic components of 1 to 3 carbon atoms including CCl₂F₂ and F₃CCOCF₂Cl.

13. The method of claim 9 in which the aryl halomethyl carbinol is a trifluoromethyl carbinol.

14. The method of claim 9 in which the aryl halomethyl carbinol is 1,3-bis-(hexafluoro-2-hydroxy-2-propyl)benzene and the mixed organic compounds are selected from the group consisting of natural gas and F₃CCOCl mixed with close boiling chloro- and fluoro-aliphatic compounds which have a carbon chain length of 12 or less carbon atoms including CCl₂F₂ and $$F_3CCOCF_2Cl$$

15. The method of claim 9 in which the aryl halomethyl carbinol is bis-(hexafluoro-2-hydroxy-2-propyl) diphenyl oxide and the mixed organic compounds are selected from the group consisting of (a) natural gas, (b) n-heptane and close-boiling aliphatic hydrocarbons which have a carbon chain length of 12 or less carbon atoms, and (c) F₃CCOCl and close-boiling chloro- and fluoro-aliphatic components of 1 to 3 carbon atoms including CCl₂F₂ and F₃CCOCF₂Cl.

References Cited by the Examiner

UNITED STATES PATENTS

| | | | |
|---|---|---|---|
| 3,065,185 | 11/1962 | Burns et al. | 252—428 |
| 3,164,980 | 1/1965 | Loyd | 55—67 X |
| 3,179,640 | 4/1965 | Middleton. | |
| 3,189,558 | 6/1965 | Doedens et al. | 252—426 X |
| 3,236,894 | 2/1966 | England | 260—574 |
| 3,267,151 | 8/1966 | Pillepich | 55—67 X |

REUBEN FRIEDMAN, *Primary Examiner.*

D. M. RIESS, *Assistant Examiner.*

UNITED STATES PATENT OFFICE
CERTIFICATE OF CORRECTION

Patent No. 3,318,072　　　　　　　　　　　　　　　　　　May 9, 1967

John Frank

It is hereby certified that error appears in the above numbered patent requiring correction and that the said Letters Patent should read as corrected below.

Column 1, line 60, for "fireback" read -- firebrick --; line 62, for "ethyl" read -- methyl --; column 6, lines 10 to 15, the center portion of the formula should appear as shown below instead of as in the patent:

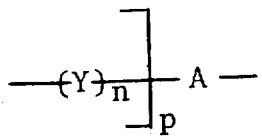

Signed and sealed this 28th day of November 1967.

(SEAL)
Attest:

EDWARD M. FLETCHER, JR.　　　　　　　　　　　　EDWARD J. BRENNER
Attesting Officer　　　　　　　　　　　　　　　　Commissioner of Patents